(12) United States Patent
Murphy

(10) Patent No.: US 6,434,189 B1
(45) Date of Patent: Aug. 13, 2002

(54) COMMUNICATIONS SYSTEM AND METHOD FOR REDUCING THE EFFECTS OF TRANSMITTER NON-LINEAR DISTORTION ON A RECEIVED SIGNAL

(75) Inventor: Joseph A. Murphy, Stittsville (CA)

(73) Assignee: STMicroelectronics, Inc., Carrollton, TX (US)

(*) Notice: Subject to any disclaimer, the term of this patent is extended or adjusted under 35 U.S.C. 154(b) by 0 days.

(21) Appl. No.: 09/335,024

(22) Filed: Jun. 17, 1999

(51) Int. Cl.[7] .............................. H04B 1/38; H04L 5/16
(52) U.S. Cl. ..................................................... 375/222
(58) Field of Search ................................. 375/219, 220, 375/222, 224, 256, 285, 295, 296, 316, 346; 570/523–526

(56) References Cited

U.S. PATENT DOCUMENTS

| | | | |
|---|---|---|---|
| 4,606,047 A | * | 8/1986 | Wilkinson |
| 5,097,485 A | * | 3/1992 | O'Connor et al. |
| 5,177,734 A | * | 1/1993 | Cummiskey et al. |
| 5,515,398 A | * | 5/1996 | Walsh et al. |
| 6,285,654 B1 | * | 9/2001 | Marchok et al. |

OTHER PUBLICATIONS

ADSL Tutorial, "Twisted Pair Access to the Information Highway," ADSL Forum, Web site www.adsl.com.

* cited by examiner

Primary Examiner—Jean Corrielus
(74) Attorney, Agent, or Firm—Lisa K. Jorgenson; Andre M. Szuwalski

(57) ABSTRACT

A communications system, a digital modem and method are provided for reducing non-linear distortion generated by a transmitter which adversely affects a receiver attempting to demodulate received data. More specifically, the digital modem includes a controller that controls a receiver and a transmitter. The receiver is operable to receive a plurality of receiver tones, and the transmitter is operable to generate a plurality of transmitter tones whose intermodulation products (transmitter non-linear distortion) conflict with the plurality of receiver tones. The transmitter is also operable to shift the plurality of transmitter tones by a predetermined distance to move the conflicting intermodulation products off the plurality of receiver tones.

24 Claims, 7 Drawing Sheets

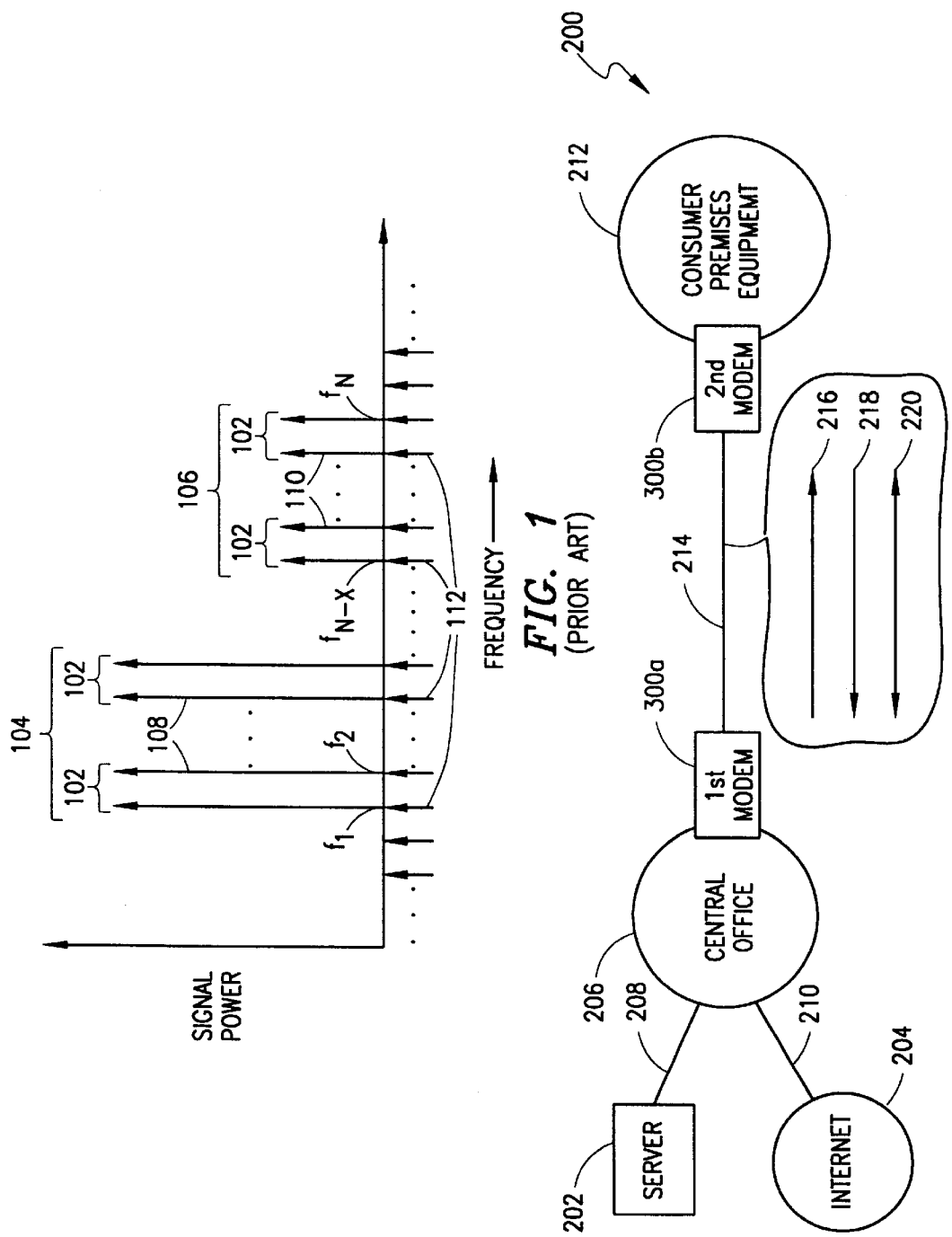

COMMUNICATIONS SYSTEM AND METHOD FOR REDUCING THE EFFECTS OF TRANSMITTER NON-LINEAR DISTORTION ON A RECEIVED SIGNAL

BACKGROUND OF THE INVENTION

1. Technical Field of the Invention

The present invention generally relates to a communications system and, in particular, to a digital modem and method that reduces the adverse effects of transmitter non-linear distortion by shifting intermodulation products attributable to the transmitter non-linear distortion off a received signal.

2. Description of Related Art

One of the most significant design challenges for operators in the telecommunications field is to develop new technology or ways of increasing the speed of communications between modems. Recently, the operators have developed and standardized a new modem technology known as Asymmetric Digital Subscriber Line (ADSL) which increases the speed of communications between digital modems. The communications can include multimedia, digital video and high speed data communications.

The ADSL technology effectively converts existing twisted-pair telephone lines into various access paths that enable such communications by increasing the speed at which digital modems communicate with each other. The access paths provided by ADSL include information channels referred to as a downstream channel and an upstream channel, where the downstream channel can overlay the upstream channel. The access paths also include a plain old telephone service (POTS) or an integrated services digital network (ISDN) channel which can work in conjunction with ADSL. The upstream channel and downstream channel can each be submultiplexed to form multiple, lower rate channels.

The current digital multi-tone based duplex communication systems and, more particularly, transmitters in the digital modems create undesirable distortions that have an adverse effect on a signal received by a receiver. The undesirable distortion also referred to as transmitter non-linear distortion is attributable to non-ideal or "real world" components located within the transmitter of the digital modem. For example, such non-ideal components can include an amplifier. To address the transmitter non-linear distortion, care is currently taken in selecting low-distortion components and in designing a receive signal path within the receiver to reduce the adverse effects of the undesirable distortion. Unfortunately, the traditional digital modems are still affected by the transmitter non-linear distortion which is illustrated in greater detail with respect to FIG. 1.

Referring to FIG. 1, there is a frequency spectrum graph illustrating a signal structure from the viewpoint of the traditional digital modem. The signal structure of the traditional digital modem includes a set of discrete tones or carriers at f1, f2 . . . fn and separated by a fundamental frequency (Fb) 102. More specifically, the signal structure includes a transmission band 104 and a receiving band 106 where both bands have a frequency range defined by the ADSL standard. The transmission band 104 includes multiple transmission tones 108 each of which are individually modulated to enable transmission of data to a corresponding traditional digital modem. The receiving band 106 includes multiple receiver tones 110 each of which contains modulated data received from the corresponding traditional digital modem. It should be understood that each receiver tone 110 and each transmission tone 108 are separated by the fundamental frequency.

As mentioned earlier, the transmitter of the traditional digital modem generates the undesirable transmitter non-linear distortion which has an adverse effect on the ability of the receiver to demodulate data received with the receiver tones 110. In a two tone scenario, the transmission non-linear distortion is due to intermodulation products 112 between two carriers f1 and f2 (for example) represented by:

$$mf1 \pm nf2 \qquad (1)$$

where m and n are integers.

In normal operation when all the transmitter tones 108 are considered, the intermodulation products 112, which can have varying signal power levels, appear as discrete carriers spaced apart by multiples of the fundamental frequency 102. The intermodulation products 112 are spread over the transmission band 104 and the receiving band 106. Because some of the intermodulation products 112 fall directly on or very close to the receiver tones 110, this may adversely affect the ability to correctly demodulate the data received from the corresponding traditional digital modem. Moreover, the adverse effect of the intermodulation products 112 is greater when the signal power of the receiver tones 110 is less than the signal power of the transmitter tones 108. Therefore, there is a need for a communications system and, more specifically, a digital modem and method that reduces the adverse effects of intermodulation products by shifting the transmitter tones a predetermined distance to move the intermodulation products off the receiver tones.

BRIEF DESCRIPTION OF THE INVENTION

The present invention is a communications system, a digital modem and method for reducing non-linear distortion generated by a transmitter which adversely affects a receiver attempting to demodulate received data. More specifically, the digital modem includes a controller that controls a receiver and a transmitter. The receiver is operable to receive a plurality of receiver tones, and the transmitter is operable to generate a plurality of transmitter tones whose intermodulation products (transmitter non-linear distortion) conflict with the plurality of receiver tones. The transmitter is also operable to shift the plurality of transmitter tones by a predetermined distance to move the conflicting intermodulation products off the plurality of receiver tones.

BRIEF DESCRIPTION OF THE DRAWINGS

A more complete understanding of the method and apparatus of the present invention may be had by reference to the following detailed description when taken in conjunction with the accompanying drawings wherein:

FIG. 1 (PRIOR ART), previously described, is a graph illustrating the frequency spectrum from the viewpoint of a traditional digital modem;

FIG. 2 is a diagram of an exemplary communications system incorporating a pair of exemplary digital modems in accordance with the present invention;

DETAILED DESCRIPTION OF THE DRAWINGS

Figure 3:
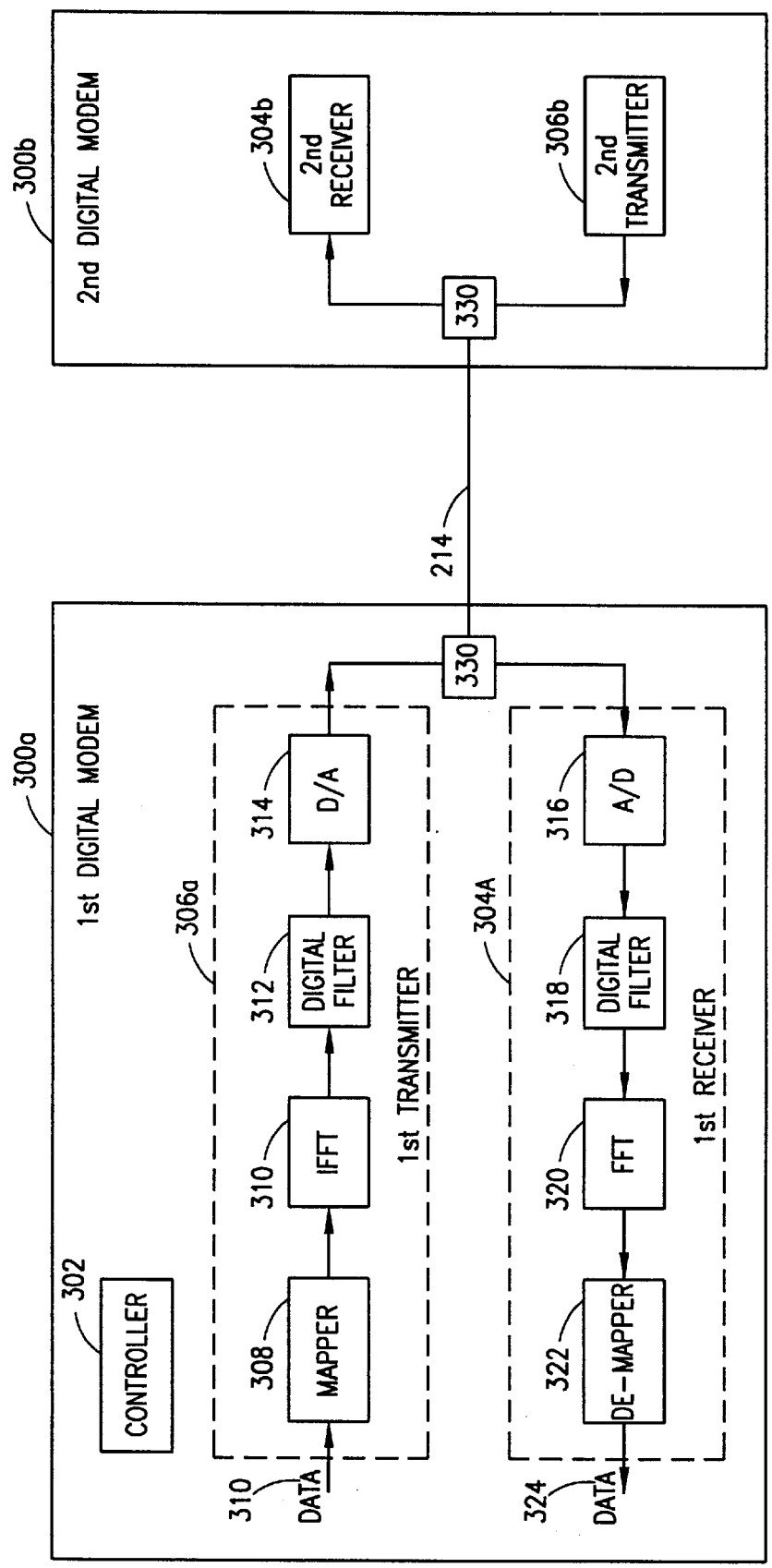
FIG. 3 is a block diagram of a first embodiment of the digital modems shown in FIG. 2.

Referring to the Drawings, wherein like numerals represent like parts throughout FIGS. 2–8, there are disclosed an exemplary digital multi-tone based duplex communications system 200, exemplary digital modems 300a and 300b, and a preferred method 700 each of which reduces the adverse effects of transmission non-linear distortion in accordance with the present invention.

Although the communications system 200 is described with respect to the digital modems 300a and 300b operating in accordance with the ADSL or G.Lite standards, it should be understood that the present invention can be used within any communication device, but is especially suited for use with full duplex communication devices. Accordingly, the communications system 200, the digital modems 300a and 300b and the preferred method 700 described should not be construed in a limited manner.

Referring to FIG. 2, there is illustrated a diagram of the communications system 200 incorporating the digital modems 300a and 300b. Certain details associated with the communications system 200 and the digital modems 300a and 300b are known in the industry and as such need not be described herein. Therefore, for clarity, the description provided below in relation to the communications system 200 and the digital modems 300a and 300b omits some components known to those skilled in the art that are not necessary to understand the invention.

Figure 6:
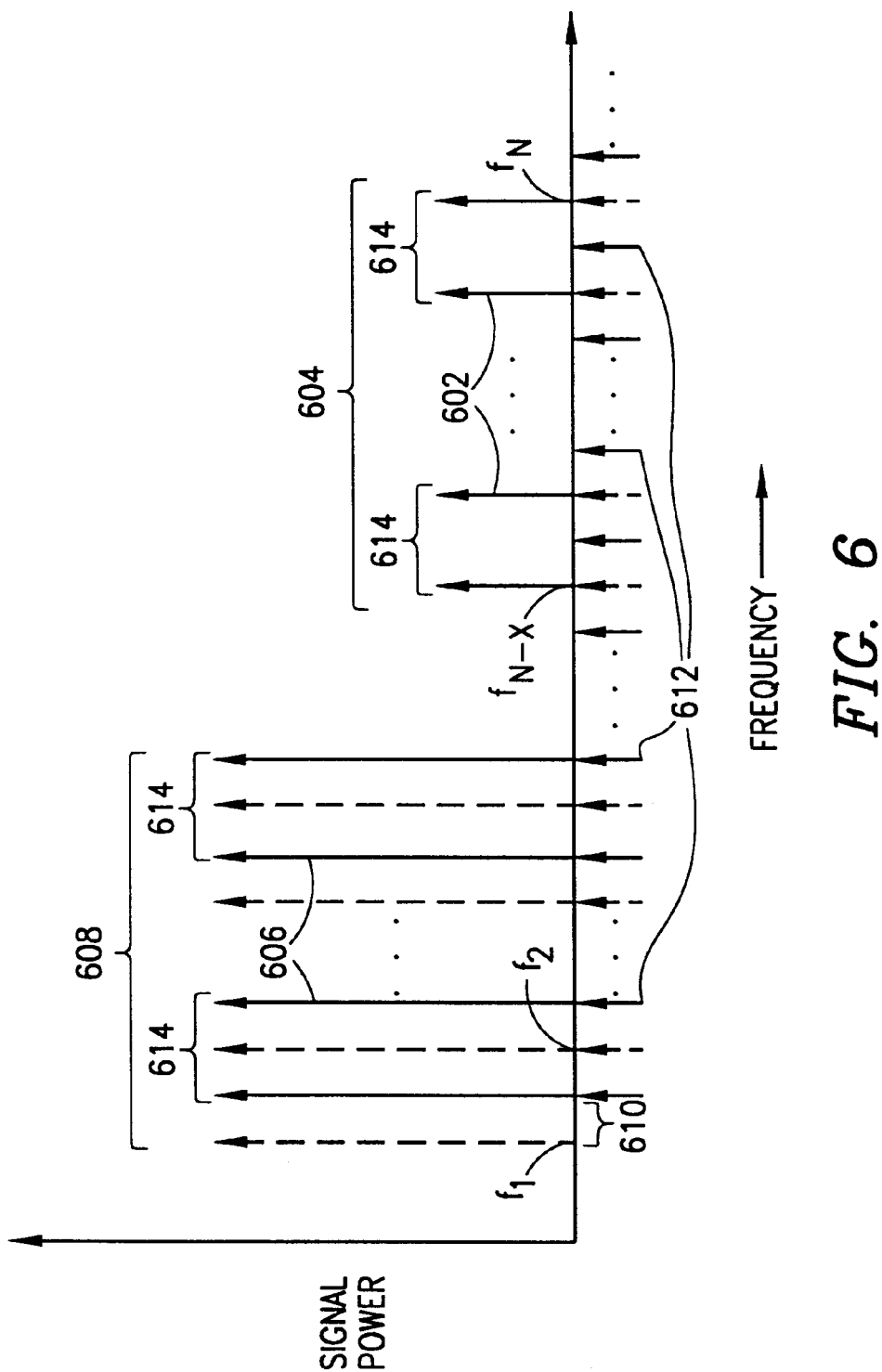
FIG. 6 is a graph illustrating the frequency spectrum resulting from the use of either of the digital modems shown in FIGS. 3 and 5.

Generally, the communications system 200 and, more particularly, digital modem 300a or 300b operates to reduce the adverse effects of transmitter non-linear distortion by shifting the transmitter tones a predetermined distance in the frequency domain to move the corresponding intermodulation products off the receiver tones (compare FIGS. 1 and 6). A detailed description of the preferred method 700 describing how the transmitter tones and intermodulation products are moved to reduce the effects of transmitter non-linear distortion is deferred pending a discussion about the architecture of the communications system 200 and digital modems 300a and 300b.

The communications system 200 can include a server 202 and/or Internet 204 coupled to a central office 206 using lines 208 and 210, respectively. The central office 206 includes the first digital modem 300a which is connected to the second digital modem 300b of a consumer premises equipment 212. The first digital modem 300a and the second digital modem 300b are connected to one another using a conductor 214. The conductor 214 can be a twisted-pair telephone line.

The conductor 214 is divided into various access paths which enable communications, such as multimedia, digital compressed video and high speed data communications to travel between the digital modems 300a and 300b. The access paths or information channels include a downstream channel 216 and an upstream channel 218, where the downstream channel can overlap the upstream channel. The access paths also include a POTS/ISDN channel 220 which can work in conjunction with ADSL. The downstream channel 216 and the upstream channel 218 each can be submultiplexed to form multiple, lower rate channels.

The central office 206 and consumer premises equipment 212 can communicate with one another to determine whether the first digital modem 300a and the second digital modem 300b are capable of reducing the effects of transmitter non-linear distortion in accordance with the present invention. If the digital modems 300a or 300b are not "friendly" or "compatible," then the modems communicate in the traditional manner as described in the Description of Related Art Section. Assuming the digital modems 300a and 300b are "friendly" or "compatible," the central office 206 then negotiates with the consumer premises equipment 212 to determine whether to shift downlink communications (e.g., tones) or shift the uplink communications (e.g., tones) between the first digital modem 300a and the second digital modem 300b.

The central office 206 may consider one or more factors in determining whether to shift the uplink communications or the downlink communications. The factors may include (for example): (1) signal-to-noise ratio (SNR) across a receiving band of interest; (2) received signal strength; (3) knowledge of the non-linear performance associated with analog components; (4) knowledge of transmit power; and (5) the bit error rate achieved for a given SNR.

If the downlink communications are to be shifted, then the first digital modem 300a operates to shift the transmitter tones containing modulated data, and the second digital modem 300b operates to shift, sample and demodulate the shifted data received from the first digital modem. Otherwise, if the uplink communications are to be shifted, then the second digital modem 300b operates to shift the transmitter tones containing modulated data, and the first digital modem 300a operates to shift, sample and demodulate the shifted data received from the second digital modem. The shifting of the tones will be described in greater detail with respect to FIGS. 3–8.

Referring to FIGS. 3 and 6, there is a block diagram of a first embodiment of the digital modems 300a and 300b, and a frequency spectrum graph illustrating the results from using the digital modems. To avoid repetition, only the shifting of the downlink communications is described with respect to FIGS. 3–6 since the operation of shifting the uplink communications and the downlink communications only differs with respect to which particular transmitter 306a or 306b of the modems 300a or 300b is actually performing the shifting step as described above.

The first digital modem 300a includes a controller 302 operable to control a receiver 304a and a transmitter 306a. The receiver 304a is operable to receive data transmitted from a transmitter 306b of the second digital modem 300b. The received data has been modulated (e.g., quadrature amplitude modulated) onto a set of receiver tones 602 (see FIG. 6). The receiver tones 602 are transmitted within a receiving frequency band 604 by the second digital modem 300b and received by the first digital modem 300a. In the current example, the receiver tones 602 received at modem 300a are not frequency shifted by the transmitter 306b of the second digital modem 300b.

The transmitter 306a of the first digital modem 300a is operable to transmit data to a receiver 304b of the second digital modem 300b where the transmit data has been modulated (e.g., quadrature amplitude modulated) onto a set of transmitter tones 606. The transmitter tones 606 are shifted and transmitted within a predefined transmission band 608 by the first digital modem 300a and received by the second digital modem 300b. In the current example, the transmitter tones 606 are shifted by a predetermined frequency or a predetermined distance 610 (e.g., Fb/2, where Fb is the minimum frequency separation between tones) by the transmitter 306a of the first digital modem 300a. The shifting of the transmitter tones 606 also results in a similar shift in the intermodulation products 612 which appear as discrete carriers spread over the transmission band 608 and the predefined receiving band 604 and are spaced apart by multiples of a fundamental frequency 614 (e.g., Fb). The shifted intermodulation products 612 are no longer directly on or very close to the receiver tones 602 received by modem 300a (compare FIG. 1). The dashed lines in FIG. 6 represent the original locations of the transmitter tones 606 and intermodulation products 612 before the shift operations of the present invention.

It should be understood that the transmitter tones 606 sent from the first digital modem 300a appear as receiver tones (not shown) to the receiver 304b of the second digital modem 300b. Likewise, the receiver tones 602 received by the first digital modem 300a correspond with transmitter tones (not shown) sent by the transmitter 306b of the second digital modem 300b. Each receiver 304 and transmitter 306 in the digital modems 300a and 300b connect to a line interface unit 330 (e.g., diplexer) between which the conductor 214 is located.

As illustrated, each of the transmitter tones 606 are separated from one another by multiples of the fundamental frequency 614. And, each of the receiver tones 602 are separated from one another by multiples of the fundamental frequency 614. However, in some communications systems, the transmitter tones 606 and the receiver tones 602 can overlap one another such that selected ones of the transmitter tones and receiver tones use the same frequency. It should also be understood that the signal power of the transmitter tones 606 is generally greater than the signal power of the receiver tones 602 from the viewpoint of the first digital modem 300a.

Referring specifically to the first embodiment of the digital modem 300a, the transmitter 306a further includes a constellation mapper 308 that assigns data 310 (e.g., serial/parallel data stream) to each one of the transmitter tones 606 as a complex number created using a predetermined modulation scheme (e.g., quadrature amplitude modulation). An inverse fast fourier transformer (IFFT) 310 connected to the mapper 308 operates to shift each transmitter tone 606 and each intermodulation product 612 (caused by a multiplication process) by the predetermined distance 610 (compare FIGS. 1 and 6). The IFFT 310 further operates to convert the shifted transmitter tones 606 to a time-domain signal. The time-domain signal is then filtered by a digital filter 312 connected to the IFFT 310.

Thereafter, the filtered time-domain signal is converted from a digital domain signal into an analog domain signal by a digital-to-analog converter (D/A) 314 before being transmitted to the receiver 304b of the second digital modem 300b. The modulated receiver 304b, with knowledge of the shifted predetermined frequency 610 (e.g., Fb/2), operates to sample and demodulate the transmit information modulated in the shifted transmitter tones 606.

As mentioned above, the receiver 304a operates to receive data modulated in the receiver tones 602 sent from the transmitter 306b of the second digital modem 300b. More specifically, the receiver 304a further includes an analog-to-digital convertor 316 for converting the received data from a time-domain signal in analog domain to a digital signal in digital domain. The converted received data is then filtered by a digital filter 318 and input into a fast fourier transformer (FFT) 320. Assuming the receiver tones 602 were not shifted by the transmitter 306b of the second digital modem 300b, the FFT 320 then samples the filtered data and forwards the sampled data to a constellation de-mapper 322. The constellation de-mapper 322 completes the demodulation of the sampled data and outputs a stream of data 324.

Figure 4:
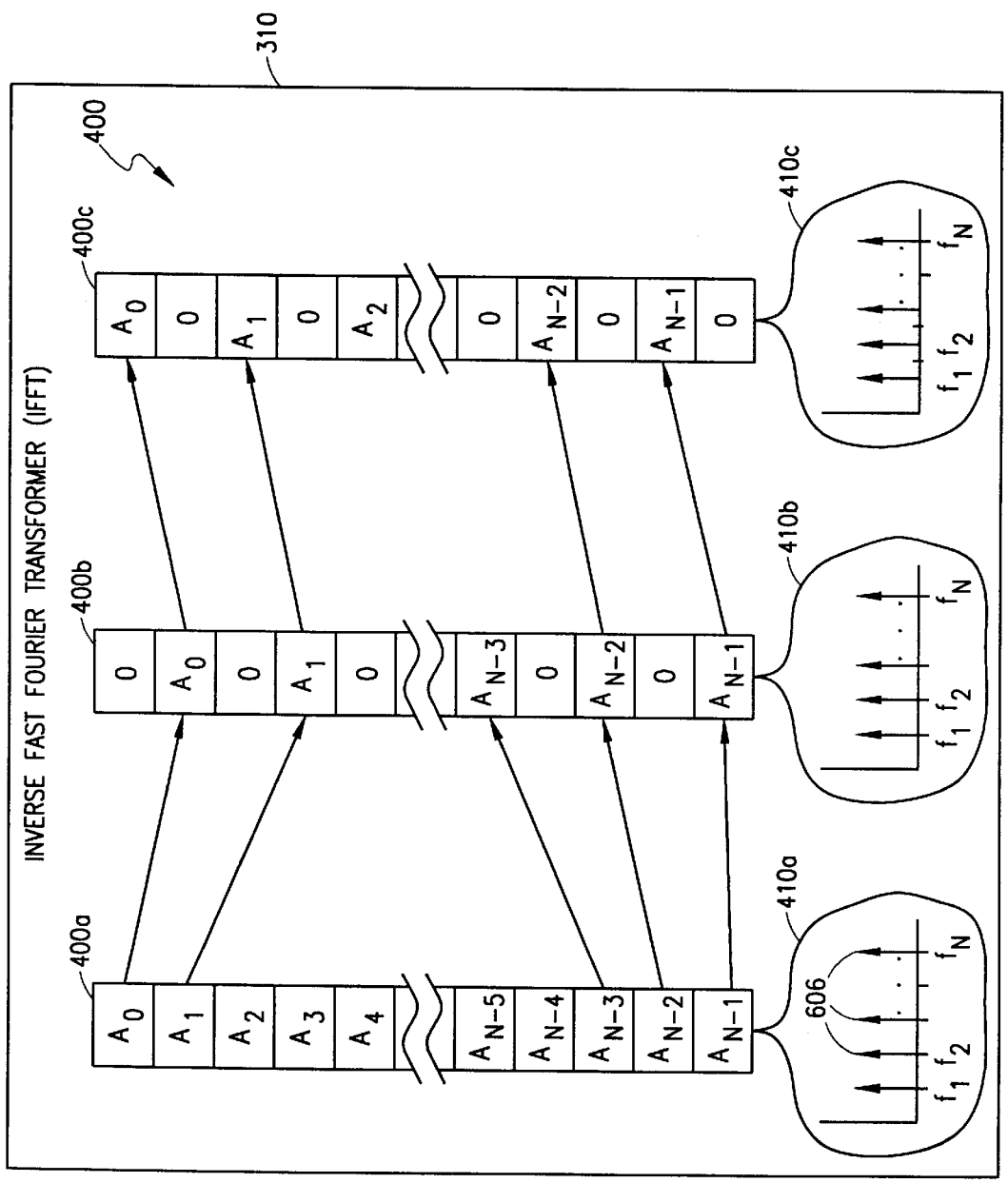
FIG. 4 is a block diagram of an inverse fast fourier transformer used in the first embodiment digital modems shown in FIG. 3.

Referring to FIG. 4, there is illustrated in greater detail the IFFT 310 shown in FIG. 3. As mentioned above, the IFFT 310 operates to shift each transmitter tone 606 and each intermodulation product 612 before converting the shifted transmitter tones to a time-domain signal.

More specifically, the IFFT 310 includes an array 400 for receiving assigned data $A_0, A_1 \ldots A_n$ as a complex number from the constellation mapper 308 (see array 400a). The array 400 is then padded with zeros so that each transmitter tone 606 and, more specifically, each assigned data $A_0, A_1 \ldots A_n$ is separated by a zero value (see array 400b). Thereafter, the IFFT 310 operates to shift "up" (shown as array 400c) or "down" (not shown) each zero value and each assigned data $A_0, A_1 \ldots A_n$ in the array 400b so that the transmitter tones 606 and corresponding intermodulation products 612 are shifted by the predetermined distance 610 (see diagram 410c and FIG. 6).

In effect, operating the IFFT 310 at the same rate and having an array 400b twice as long as array 400a, but with an assigned zero value in every other element, effectively creates the same signal as if a signal were to be made in the array 400a without zero padding. To illustrate this point, reference is made to the transmitter tones shown in diagrams 410a, 410b and 410c that correspond with arrays 400a, 400b and 400c.

It should be understood that the frequency of each transmitter tone is determined by its order in the IFFT 310 and the sample rate of the IFFT. For example, if the IFFT 310 is sampled twice as fast, then the transmitter tones in the time domain signal appear to be twice that of the original. Also, if the length of the array is doubled and the sample rate remains the same, then the number of transmitter tones doubles and the distance between adjacent transmitter tones is halved.

Of course, when the IFFT 310 of the first digital modem 300a operates to shift the transmitter tones 606 and the intermodulation products 612, the corresponding FFT (not shown) in the second digital modem 300b is controlled to sample at the appropriate rate (e.g., twice as fast) to ensure the proper reception and demodulation of the received transmitter tones.

More particularly, the doubling of samples used in the IFFT 310 and packing of 0s to implement the frequency shift could also be applied to the FFT 330. In this embodiment, the FFT 310 would sample at twice the original rate to ensure the frequency resolution of $F_b/2$. In such as case, the FFT 310 would have twice as many frequency bins as before, but the receiver 304a would know a priori which bins should have 0s. Because, the IFFT 310 and FFT 320 could take advantage of the knowledge that certain frequency bins would be 0s this could lead to more efficient implementations.

The above-mentioned example with reference to arrays 400a, 400b and 400c indicates that the predetermined distance or the frequency shift 610 is equal to half of the fundamental frequency 614. Instead of the frequency shift 610 being one-half the fundamental frequency 614, other degrees of frequency shifts are also permissible simply by increasing the size of the array 400b until the desired resolution or desired distance is achieved. In addition, it is possible to control the transmitter 304a to perform a frequency shift that is one-half of the fundamental frequency 614 (for example) and to control the other transmitter 304b to perform a frequency shift that is one-third that of the fundamental frequency (for example).

Figure 5:
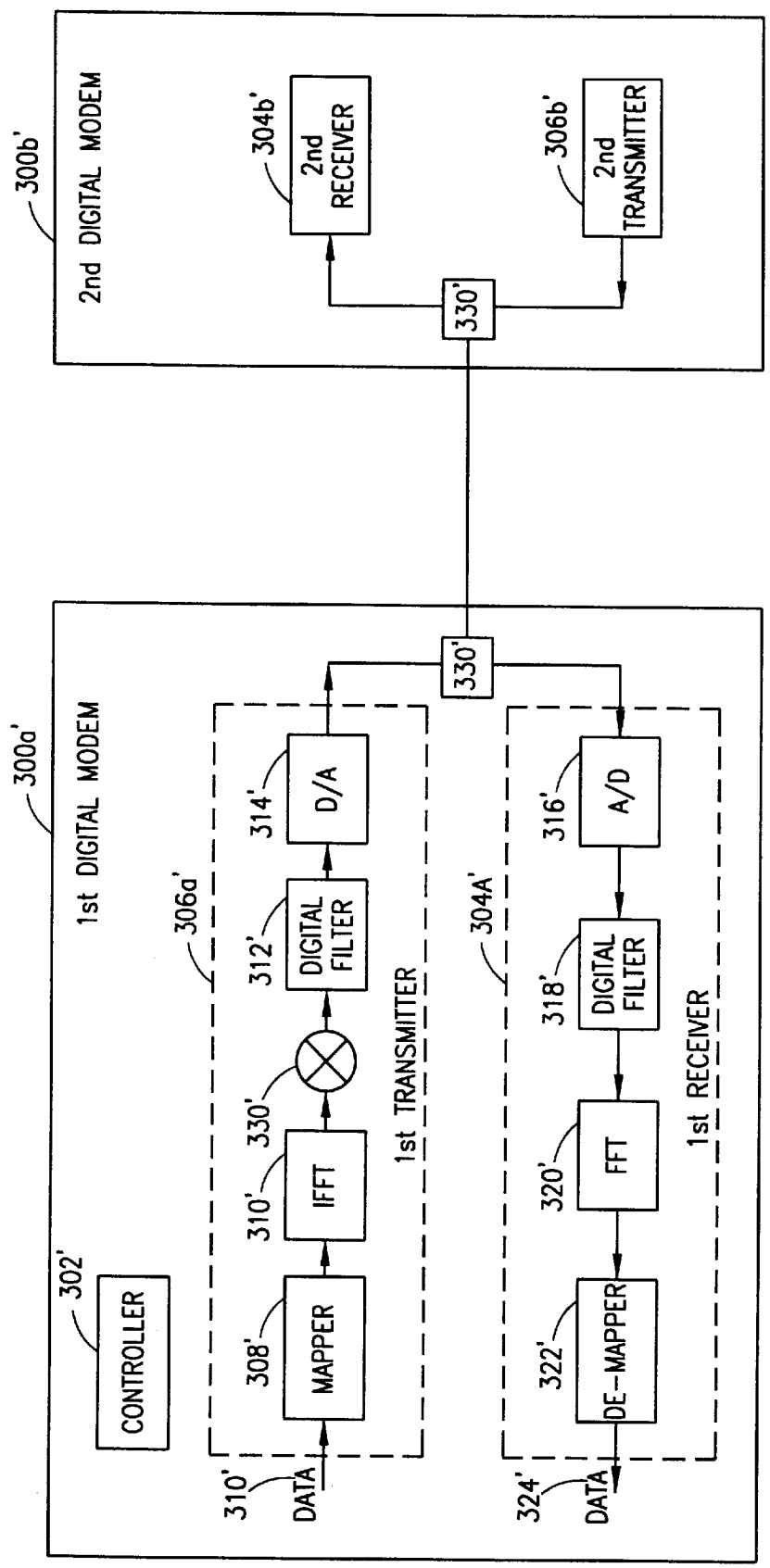
FIG. 5 is a block diagram of a second embodiment of the digital modems shown in FIG. 2.

Reference is now made to FIG. 5, where a second embodiment of the digital modems 300a and 300b is illustrated using prime reference numbers. The digital modems 300a' and 300b' are similar to the first embodiment except for the addition of a complex multiplier 330' in the transmitter 306a' that performs the shifting operation instead of the IFFT 310 performing the shifting operation as in the first embodiment. Thus, the IFFT 310' performs only the converting operation and not the shift operation described in the first embodiment. The complex multiplier 330' that multiplies the time domain signal by a predetermined frequency offset can be located between the IFFT 310' and the digital filter 312'.

Figure 7:
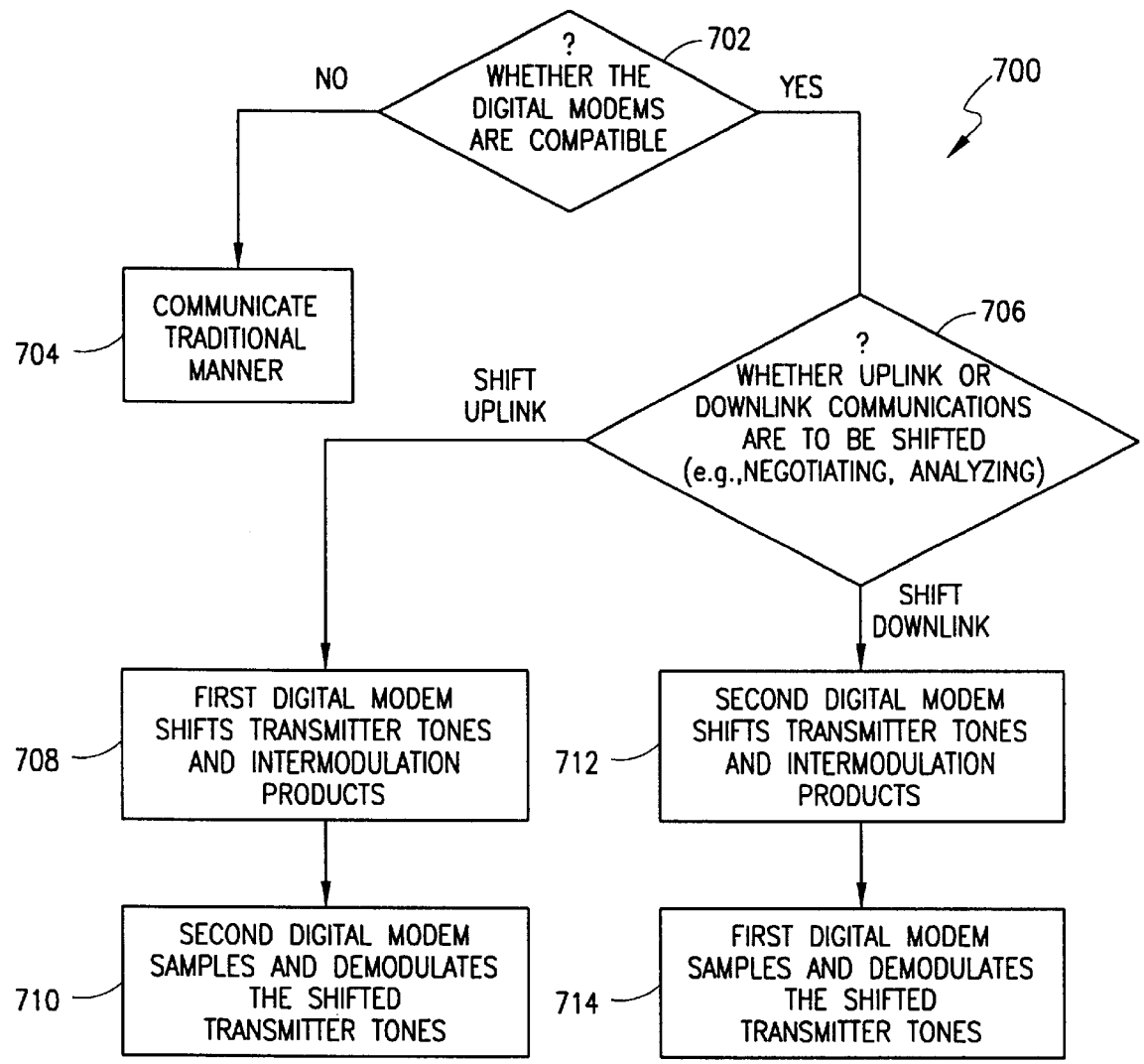
FIG. 7 is a flowchart illustrating the basic steps of the preferred method in accordance with the present invention.

Referring to FIG. 7, there is a flowchart illustrating the basic steps of the preferred method 700. Beginning at step 702, the central office 206 and consumer premises equipment 212 communicate with one another to determine whether the first digital modem 300a and the second digital modem 300b are capable of reducing the effects of transmission non-linear distortion in accordance with the present invention. In other words, the central office 206 and the consumer premises equipment 212 communicate to determine whether the digital modems 300a and 300b are "friendly" or "compatible" with one another with respect to the shifting functionality.

In response to a negative determination, the digital modems 300a and 300b communicate with one another in the traditional manner, see step 704. The traditional manner was described earlier in the Description of Related Art Section. Otherwise, at step 706, the central office 206 negotiates with the consumer premises equipment 212 to determine if downlink communications or uplink communications between the first digital modem 300a and the second digital modem 300b are to be shifted by the predetermined distance.

If the downlink communications are selected to be shifted, the first digital modem 300a operates to shift (step 708; see also FIG. 8) the transmitter tones 606 and the intermodulation products 612 by the predetermined distance 614 (see original and shifted locations shown in FIG. 6) to move the intermodulation products off the receiver tones 602. And, the second digital modem 300b operates to sample and demodulate (step 710) the shifted transmitter tones 606a that are received from the first digital modem 300a.

Otherwise, if the uplink communications are to be shifted, then the second digital modem 300b operates to shift (step 712; see also FIG. 8) the transmitter tones and the intermodulation products by the predetermined distance to move the intermodulation products off the receiver tones. And, the first digital modem 300a operates to sample and demodulate (step 714) the shifted transmitter tones from the second digital modem 300b.

Figure 8:
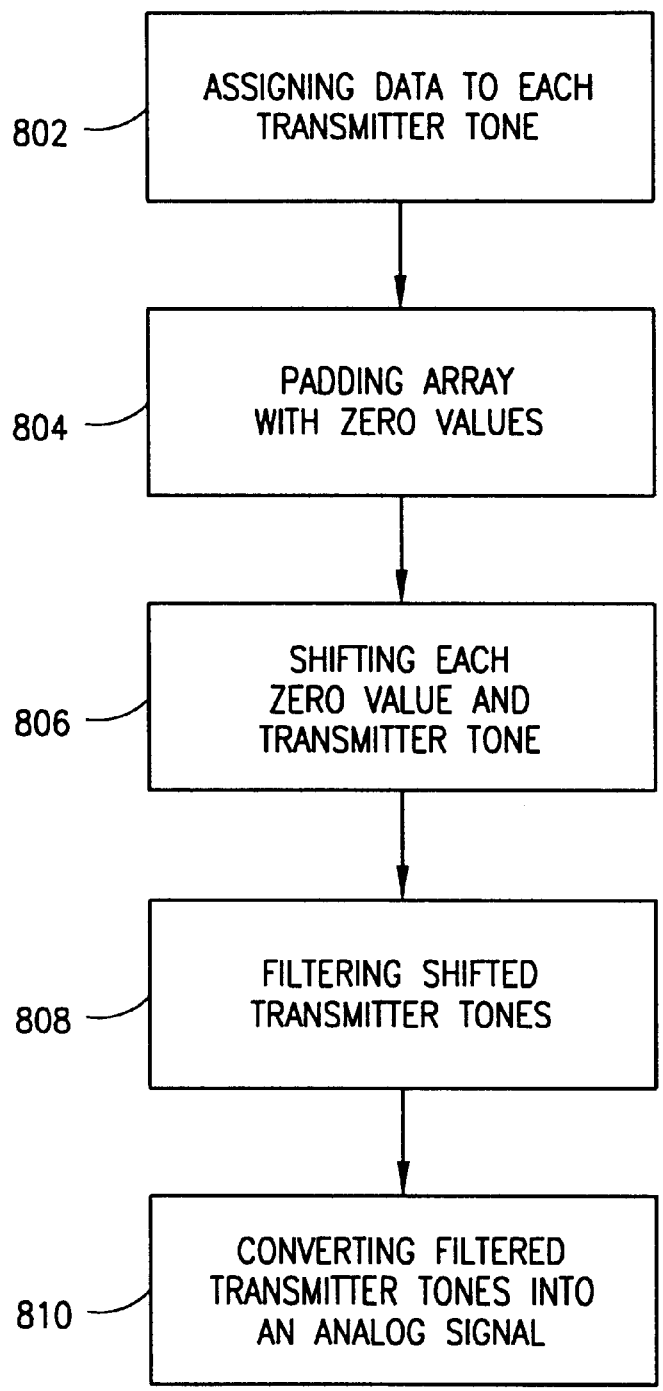
FIG. 8 is a flowchart illustrating a shifting operation for the preferred method shown in FIG. 7.

Referring to FIG. 8, there is a flowchart illustrating in greater detail the shifting steps 708 and 712 of the preferred method 700. Each of the shifting steps 708 and 712 are essentially the same, except that shifting step 708 is performed in the first digital modem 300a and the shifting step 712 is performed in the second digital modem 300b. The steps discussed below relate to the first embodiment of the invention, because the shifting step of the second embodiment involves using the complex multiplier 330' as described above.

At step 802, the constellation mapper 308 assigns data 310 to each one of the transmitter tones 606. Each of the assigned data is a complex number created using a modulation scheme (e.g., quadrature amplitude modulation).

At step 804, the IFFT 310 operates to pad array 400a containing the assigned data so that each of the transmitter tones 606 are separated by a zero value. Then at step 806, the IFFT 310 operates to shift each zero value and each transmitter tone 606 so that the intermodulation products 612 are moved off the receiver tones 602 (see FIG. 6). Again, the magnitude of the shift is equal to the predetermined distance 610 which can be a factor of the fundamental frequency 614.

At step 808, the digital filter 312 operates to filter the shifted transmitter tones 606 represented as a time-domain signal. Thereafter, at step 808, the digital-to-analog convertor operates to convert the filtered time-domain signal from a digital signal into an analog signal before being transmitted to the receiver 304b of the second digital modem 300b.

From the foregoing, it can be readily appreciated by those skilled in the art that the present invention provides a communications system and, more particularly, a digital modem and method for reducing non-linear distortion generated by a transmitter which adversely affects a receiver attempting to demodulate received data thus allowing the use of components having less stringent non-linear requirements when compared to traditional digital modems. Also, the digital modem and method disclosed effectively increases the overall throughput by increasing the number of bits of data that can be demodulated per discrete tone, and effectively increases the permissible length of a telephone line possible for a given bit rate and a given bit error rate when compared to the traditional digital modems.

Although two embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A modem, comprising:
   a controller;
   a receiver, coupled to said controller, operable to receive a plurality of receiver tones;
   a transmitter, coupled to said controller, operable to generate a plurality of transmitter tones whose intermodulation products conflict with the plurality of receiver tones; and
   said transmitter, responsive to said controller, operable to shift the plurality of transmitter tones by a predetermined distance to move the conflicting intermodulation products off the plurality of receiver tones.

2. The modem of claim 1, wherein said transmitter further includes a complex multiplier for shifting the plurality of transmitter tones.

3. The modem of claim 1, wherein said transmitter further includes an inverse fast fourier transformer for shifting the plurality of transmitter tones.

4. The modem of claim 1, wherein said plurality of intermodulation products further includes transmission non-linear distortion that is attributable to frequency components of the plurality of transmitter tones.

5. The modem of claim 1, wherein each transmitter tone is separated from one another by a fundamental frequency.

6. The modem of claim 5, wherein said predetermined distance further includes a predetermined factor of the fundamental frequency.

7. A communications system, comprising:

a first modem;

a conductor;

a second modem coupled to said first digital modem by said conductor;

said first modem further including:

a controller;

a receiver, coupled to said controller, operable to receive a plurality of receiver tones transmitted from the second modem;

a transmitter, coupled to said controller, operable to generate a plurality of transmitter tones whose intermodulation products conflict with the plurality of receiver tones; and said transmitter, responsive to said controller, operable to shift the plurality of transmitter tones by a predetermined distance to move the conflicting intermodulation products off the plurality of receiver tones prior to transmitting the plurality of transmitter tones to said second modem.

8. The communications system of claim 7, wherein said transmitter further includes:

a mapper for assigning data to each transmitter tone;

an inverse fast fourier transformer for shifting each transmitter tone and each intermodulation product by the predetermined distance and for converting said shifted transmitter tones to a time-domain signal;

a filter for filtering the time-domain signal; and an analog-to-digital converter for converting the time-domain signal from an analog domain signal into a digital domain signal.

9. The communications system of claim 8, wherein each assigned data further includes a complex number created using a predetermined modulation scheme.

10. The communications system of claim 7, wherein said second modem further includes a receiver operable to sample and demodulate the transmitted plurality of transmitter tones.

11. The communications system of claim 7, wherein said first modem and said second digital modem each are an Asymmetric Digital Subscriber Line modem.

12. The communications system of claim 7, wherein said conductor further comprises a twisted-pair telephone line.

13. A method for communicating between a central office including a first modem and a consumer premises equipment including a second modem, said method comprising the steps of:

determining whether said first modem and said second modem are compatible with each other;

negotiating, responsive to an affirmative determination, whether to shift uplink communications or downlink communications between said first modem and said second modem;

if the downlink communications are to be shifted:

shifting, within the first modem, a first plurality of transmitter tones and a first plurality of intermodulation products a first predetermined distance to move the first plurality of intermodulation products off a first plurality of receiver tones received from the second modem; and sampling, within the second modem, the transmitted first plurality of transmitter tones.

14. The method of claim 13, wherein if the uplink communications are to be shifted said method further comprising the steps of:

shifting, within the second modem, a second plurality of transmitter tones and a second plurality of intermodulation products a second predetermined distance to move the second plurality of intermodulation products off a second plurality of receiver tones received from the first modem; and sampling, within the first modem, the transmitted second plurality of transmitter tones.

15. The method of claim 14, wherein said first plurality of receiver tones corresponds to said second plurality of transmitter tones, and said second plurality of receiver tones corresponds to said first plurality of transmitter tones.

16. The method of claim 13, wherein said step of negotiating further includes analyzing a selected one of signal-to-noise ratio, signal strength, transmit power and bit error rate.

17. The method of claim 13, wherein said step of shifting a first plurality of transmitter tones and a first plurality of intermodulation products further includes using a complex multiplier.

18. The method of claim 13, wherein said step of shifting a first plurality of transmitter tones and a first plurality of intermodulation products further includes the steps of:

assigning data to each first transmitter tone;

using an inverse fast fourier transformer for shifting each first transmitter tone and each intermodulation product by the first predetermined distance and for converting the shifted first transmitter tones to a time-domain signal;

filtering the time-domain signal; and converting the time-domain signal from a digital domain signal into an analog domain signal.

19. The method of claim 18, wherein said step of using an inverse fast fourier transformer further includes:

padding an array containing the assigned data so that each of the first plurality of transmitter tones are separated by a zero value; and shifting each zero value and each first transmitter tone so that the time-domain signal created has a frequency shift equal to the first predetermined distance.

20. A method for communicating between a first modem and a second modem, said method comprising the steps of:

shifting, within the first modem, a first plurality of transmitter tones and a first plurality of intermodulation products a first predetermined distance to move the first plurality of intermodulation products off a first plurality of receiver tones received from the second modem; and sampling, within the second modem, the transmitted first plurality of transmitter tones; or shifting, within the second modem, a second plurality of transmitter tones and a second plurality of intermodulation products a second predetermined distance to move the second plurality of intermodulation products off a second plurality of receiver tones received from the first modem; and sampling, within the first modem, the transmitted second plurality of transmitter tones.

21. A modem, comprising:

a controller;

a receiver, coupled to said controller, operable to receive a plurality of receiver tones;

a transmitter, coupled to said controller, operable to generate a plurality of transmitter tones whose intermodulation products effect the plurality of receiver tones; and said transmitter, responsive to said controller, operable to change the modem from a traditional mode to a shift mode, where the change to the shift mode shifts the plurality of transmitter tones by a predetermined distance to move the intermodulation products off the plurality of receiver tones.

22. A digital modem, comprising:

a controller;

a receiver, coupled to said controller, operable to receive a plurality of receiver tones;

a transmitter, coupled to said controller, operable to generate a plurality of transmitter tones; and said controller being operable to configure said transmitter to change the transmitter of the modem from a first mode to a second mode, where the change to the second mode shifts the plurality of transmitter tones by a predetermined distance from first mode locations to move conflicting intermodulation products off the plurality of receiver tones, and said receiver operable in the second mode to shift, sample and demodulate the plurality of receiver tones.

23. A method for shifting frequency within a modem, said method comprising the steps of:

shifting, within the modem, a first plurality of transmitter tones and a first plurality of intermodulation products a first predetermined distance to move the first plurality of intermodulation products off a first plurality of receiver tones received from another modem; and sampling, within said another modem, the transmitted first plurality of transmitter tones.

24. An apparatus comprising:

a controller;

a receiver, coupled to said controller, operable to receive a plurality of receiver tones;

a transmitter, coupled to said controller, operable to generate a plurality of transmitter tones whose intermodulation products effect the plurality of receiver tones; and said transmitter, responsive to said controller, operable to shift the plurality of transmitter tones by a predetermined distance to move the conflicting intermodulation products off the plurality of receiver tones.

* * * * *

UNITED STATES PATENT AND TRADEMARK OFFICE
CERTIFICATE OF CORRECTION

PATENT NO. : 6,434,189 B1
DATED : August 13, 2002
INVENTOR(S) : Joseph A. Murphy It is certified that error appears in the above-identified patent and that said Letters Patent is hereby corrected as shown below:

<u>Column 11,</u>
Line 20, replace "receiver tones, and" with -- receiver tones; and --

Signed and Sealed this

Fourth Day of February, 2003

JAMES E. ROGAN
*Director of the United States Patent and Trademark Office*